No. 784,349.

Patented March 7, 1905.

UNITED STATES PATENT OFFICE.

WALTER RIEBENSAHM, OF BERLIN, GERMANY.

PROCESS OF MANUFACTURING LIMPID SOLUTIONS OF AGAR-AGAR AND PRODUCT OF SAME.

SPECIFICATION forming part of Letters Patent No. 784,349, dated March 7, 1905.

Application filed June 1, 1903. Serial No. 159,601. (Specimens.)

*To all whom it may concern:*

Be it known that I, WALTER RIEBENSAHM, a subject of the King of Prussia, German Emperor, and a resident of 35 Hollmannstrasse, Berlin, Kingdom of Prussia, German Empire, have invented a new and useful Process of Manufacturing a Limpid Solution of Agar-Agar, of which the following is an exact specification.

My invention relates to an improved process of manufacturing a limpid agar-agar solution.

By boiling agar-agar in water only solutions containing one-half per cent. can be obtained, which solutions can be filtered only with great difficulties.

If agar-agar is boiled in water under pressure, solutions containing four-fifths per cent. can be obtained; but the dissolving of the agar-agar can only be effected with great difficulties, and the harder pieces do not dissolve at all, but swim only in a swollen state in the solution and render the filtration very difficult.

If agar-agar is boiled in water containing mineral acids or a great quantity of free organic acids, solutions of a high percentage can be obtained; but in dissolving agar-agar in this way an inversion of the substance takes place, and the substance loses the capacity of congealing.

In order to avoid the described deficiencies and to obtain a limpid solution containing a high percentage of agar-agar, I provide my new process, which consists in dissolving the agar-agar by boiling the same under pressure in water acidulated by very small quantities of an organic acid. If, for instance, citric acid is employed, then one per cent. of same of the weight of the dry agar-agar is used. In order to obtain good results, the quantity of organic acid which is added dare not exceed 1.5 per cent. of the agar-agar to be dissolved.

By this process a homogeneous solution containing ten per cent. of agar-agar can be obtained. The unsoluble impurities form flocks in these solutions, so that the same can be easily removed by filtration.

In this process the characteristic advantages of agar-agar over gelatin will not be lost—that is to say, a solution is obtained which resists putrefaction very long, congeals quickly, and forms a stiff jelly. (A solution containing one per cent. agar-agar congeals at the same temperature as a solution containing eight per cent. of gelatin.) Furthermore, the agar-agar jellies produced by my new process are much clearer and brighter than gelatin jellies of the same viscosity. Heretofore it has been attempted to obtain solutions of agar-agar by swelling or by dissolving the same in wine. By means of this process solutions containing a high percentage of agar-agar can be obtained; but these solutions will be very little consistent—that is to say, a considerable inversion will take place.

My process is especially important for manufacturing very concentrated solutions which are required for many purposes—for instance, in the manufacture of photographic layers or films. By means of the above-described process solely it is possible to obtain concentrated limpid solutions of agar-agar, and just this kind of solutions are very important for the arts.

In order to make the invention clearer, I will proceed to describe the process by way of an example.

Sixty grams of agar-agar are macerated in cold water from ten to twelve hours. Now the surplus water is pressed out and so much fresh water added that the quantity of water amounts to about one thousand grams. Then 0.4 to 0.5 grams of citric acid are added, and the mixture is boiled for about thirty minutes in an autoclave on the water-bath. The coarser fibrous substances contained in the solution will settle down and can be removed. Hereafter the liquid is filtered, with or without the aid of pressure—for instance, in a filter containing a cellulose filtering material, which filter can be heated. The liquid thus obtained is perfectly limpid and congeals to a clear, stiff, and transparent jelly at a temperature of between 35° to 40° Celsius.

Having thus described my invention, I claim as new and desire to secure by Letters Patent of the United States—

1. The process of manufacturing a limpid solution of agar-agar, said process consisting in boiling the agar-agar under pressure in water, containing an organic acid, the quantity of organic acid not exceeding 1.5 per cent. of the quantity of agar-agar to be dissolved, substantially as described and for the purpose set forth.

2. The process of manufacturing a limpid solution of agar-agar consisting in boiling the agar-agar under pressure in water acidulated by citric acid up to 1.5 per cent. of the quantity of agar-agar to be dissolved.

3. The process of manufacturing a limpid solution of agar-agar consisting in boiling the agar-agar under pressure in water containing an organic acid the quantity of said acid not to exceed 1.5 per cent. of the quantity of agar-agar to be dissolved, allowing then the solution to settle and filtering same.

4. As a new article of manufacture a limpid solution of agar-agar produced from agar-agar by boiling same under pressure in water acidulated by an organic acid up to 1.5 per cent. of the quantity of agar-agar to be dissolved and forming a stiff and perfectly-limpid jelly when cooling.

5. As a new article of manufacture a limpid solution of agar-agar obtained from agar-agar by boiling same under pressure in water acidulated by citric acid and forming upon cooling a stiff and perfectly-limpid jelly.

In testimony whereof I have signed my name to this specification in the presence of two subscribing witnesses.

WALTER RIEBENSAHM.

Witnesses:
WOLDEMAR HAUPT,
HENRY HASPER.